May 29, 1962

G. DEARSLEY 3,036,581

APPARATUS FOR MAKING CIGARETTES

Filed May 18, 1955

INVENTOR
GEORGE DEARSLEY
BY
ATTORNEY

May 29, 1962  G. DEARSLEY  3,036,581
APPARATUS FOR MAKING CIGARETTES
Filed May 18, 1955  11 Sheets-Sheet 2
FIG. 2
FIG. 3
FIG. 4
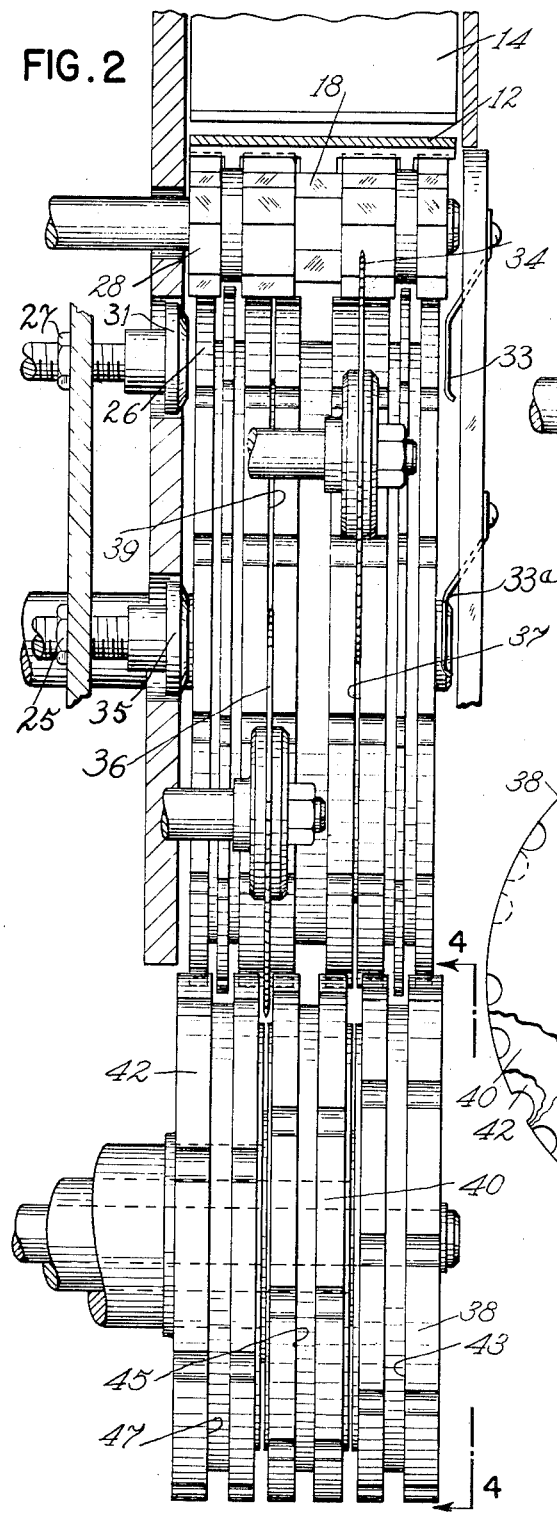
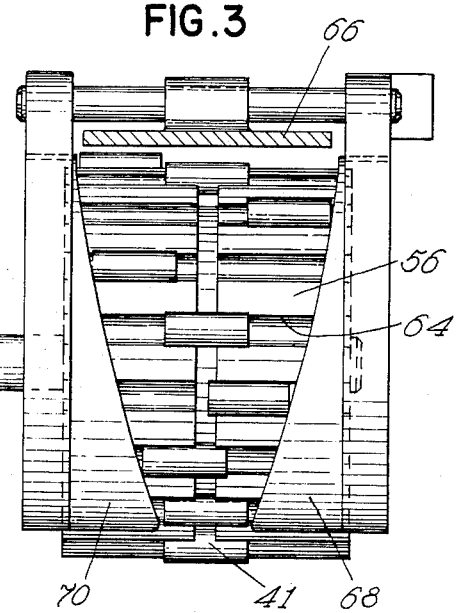
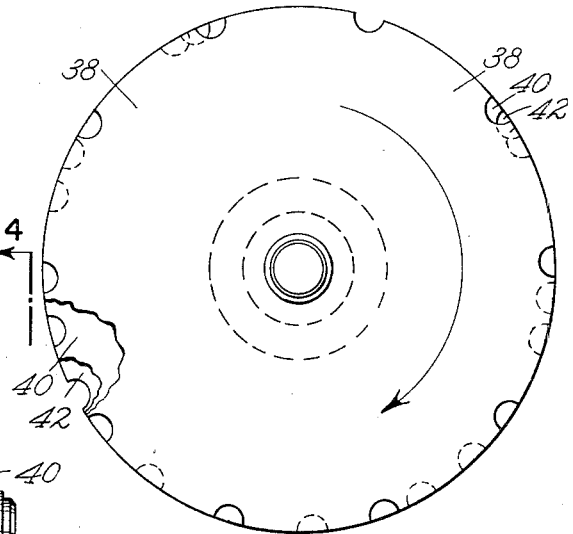
INVENTOR
GEORGE DEARSLEY
BY
ATTORNEY

INVENTOR
GEORGE DEARSLEY
BY
ATTORNEY

May 29, 1962  G. DEARSLEY  3,036,581
APPARATUS FOR MAKING CIGARETTES
Filed May 18, 1955  11 Sheets-Sheet 5
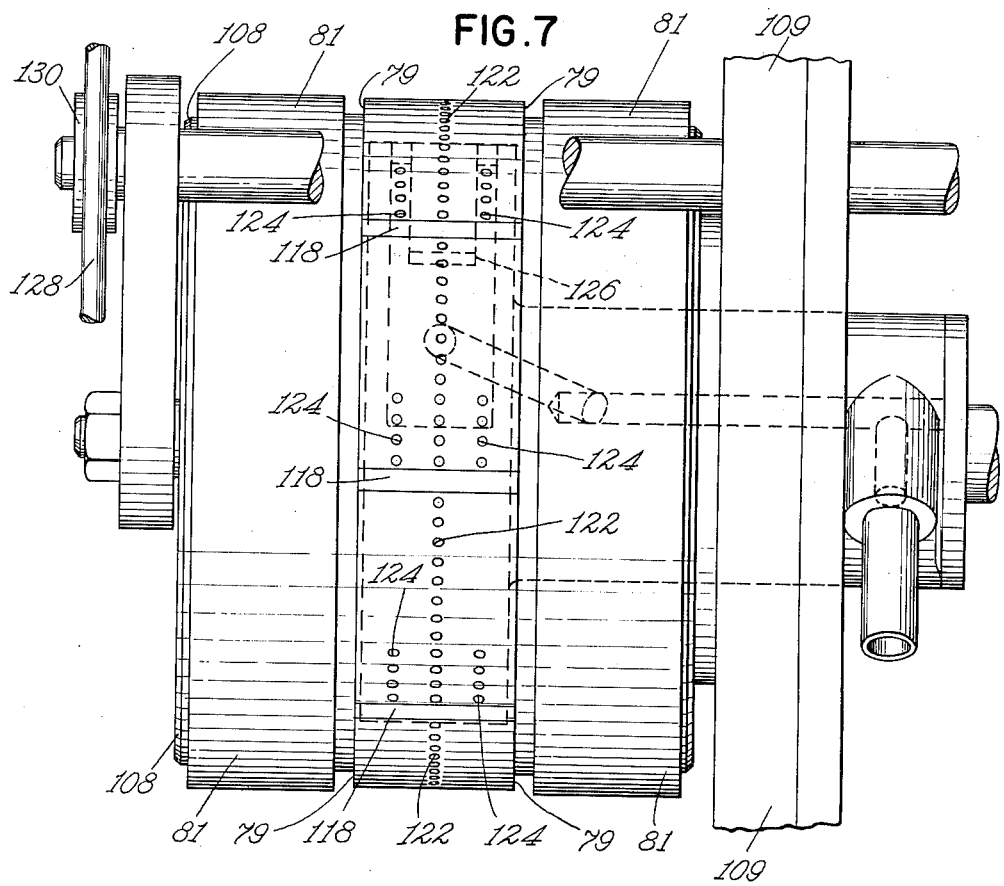
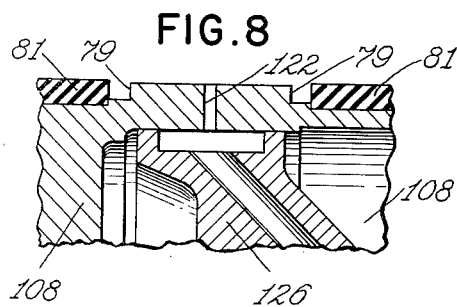
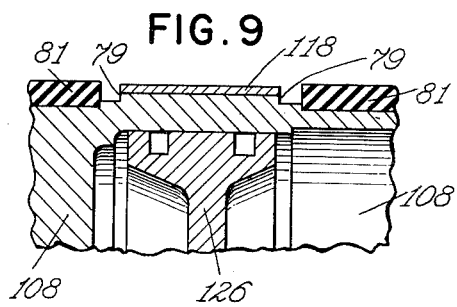
INVENTOR
GEORGE DEARSLEY
BY
ATTORNEY May 29, 1962 G. DEARSLEY 3,036,581
APPARATUS FOR MAKING CIGARETTES
Filed May 18, 1955 11 Sheets-Sheet 6

INVENTOR
GEORGE DEARSLEY
BY
ATTORNEY

May 29, 1962

G. DEARSLEY 3,036,581

APPARATUS FOR MAKING CIGARETTES

Filed May 18, 1955

INVENTOR
GEORGE DEARSLEY
BY
*Tennes J. Erstad*
ATTORNEY

May 29, 1962 G. DEARSLEY 3,036,581
APPARATUS FOR MAKING CIGARETTES
Filed May 18, 1955 11 Sheets-Sheet 8

INVENTOR
GEORGE DEARSLEY
BY
ATTORNEY

May 29, 1962 G. DEARSLEY 3,036,581
APPARATUS FOR MAKING CIGARETTES
Filed May 18, 1955 11 Sheets-Sheet 9

INVENTOR
GEORGE DEARSLEY
BY
*Tennes J Erstad*
ATTORNEY

INVENTOR
GEORGE DEARSLEY
BY
ATTORNEY

May 29, 1962   G. DEARSLEY   3,036,581
APPARATUS FOR MAKING CIGARETTES
Filed May 18, 1955   11 Sheets-Sheet 11

INVENTOR
GEORGE DEARSLEY
BY
*Tenner I Ested*
ATTORNEY

United States Patent Office

3,036,581
Patented May 29, 1962

3,036,581
APPARATUS FOR MAKING CIGARETTES
George Dearsley, Raleigh, N.C., assignor to American Machine & Foundry Company, a corporation of New Jersey
Filed May 18, 1955, Ser. No. 509,293
25 Claims. (Cl. 131—94)

This invention relates to a machine and method for making mouthpiece cigarettes and to apparatus for subdividing multiple lengths of rod shaped articles into equal subdivisions and arrange the subdivisions into single columns.

Many objections have been raised with respect to the various methods and machines heretofore employed for manufacturing filter tip cigarettes. For example: Unsatisfactory abutment between the filter and the filler resulted in "loose necks"; filters varied in length from cigarette to cigarette; cork tips were unevenly applied to the filter and cigarette filler; and the filter tip machines were cumbersome in design so that they took up a great deal of valuable floor space. These were just a few of many problems existing in this art before the present invention was developed.

With the advent of the increased demand for filter tip cigarettes, the objections to the existing filter tip making machinery then in use became even more pronounced.

Filter plug attaching machines heretofore designed have been complete units in and of themselves into which cut lengths of cigarette rod and plugs were fed to be "assembled" with each other to make filter tip cigarettes. These assembly type machines not only were relatively slow in operation so that the production of several cigarette making machines had to go to an even larger number of filter tip attaching machines, but also took up a great deal of valuable floor space.

The filter tip machines that "inserted" filter plugs directly into the line of cigarette tobacco were adaptable for use only with cigarette making machines of a particular design so that a cigarette manufacturer would have to buy a complete cigarette making machine and filter tip attachment to make filter tips in this manner. This was objectionable because mouthpiece cigarettes made by such special machines often did not have the uniformity in the filling thereof as cigarettes made on other conventional cigarette making machines.

It was obvious that the various "assembly" machines used up a considerable amount of floor space and, in addition, also had the various objections mentioned above.

Filter tip machines of the type referred to were also slow in operation and hence more costly to operate than conventional cigarette making machines. An object of this invention is to provide a filter tip apparatus which will be more economical than filter tip machines used heretofore.

Another object of this invention is to provide a cigarette filter tip attaching device which is capable of being secured directly to the end of a conventional cigarette making machine, so as to not take up any additional floor space.

It is also an object of my invention to provide a compact filter tip attaching unit which is adaptable for mounting directly on the end of a cigarette making machine so as to permit a cigarette manufacturer to employ whatever cigarette making machine he has found he prefers to make cigarettes which have the uniformity and compactness his customers desire.

Another object of this invention is to provide a filter tip attachment which is capable of operating as rapidly as a conventional cigarette making machine and which will not necessitate setting up the filter tip attaching machine in separate floor space or require the rearrangement or reorganization of cigarette making procedure in a cigarette manufacturing plant to adapt itself to the manufacture of filter tip cigarettes to supply the increasing demands for this type of cigarette.

Another object of this invention is to provide a uniting band or tip feed which will permit slippage on a suction drum to allow for proper spacing of tip or uniting band material on the drum.

A further object of this invention is to provide an improved cork tip feeding drum wherein suction holes are formed therein coacting with gates for locking off the suction, so that there will be a minimum loss of air and wherein there will be one area of suction for maintaining the cork tip in contact with the drum and another area for securing the cork tip against the drum over substantially its entire surface during the cutting operation and which will only employ a portion of this area to hold the cork tip in place as it travels around with the cork feeding drum.

Another object of this invention is to provide means for keeping the filter tip machine free from jamming and in clean running condition.

A further object of this invention is to provide a filter tip attaching machine which is readily adaptable for use with present cigarette making machines irrespective of the source of manufacture.

A further object is to provide an improved filter plug feeding, cutting and conveying means.

Another object is to provide an improved cigarette aligning device for severing assembled plugs and cigarettes so that they will be of the same size.

Another object is to provide improved means for securing and applying a cork or other tip wrapper about an assembly of cigarette lengths and filter tips.

Another object is to provide a method for making hollow mouthpiece cigarettes.

Another object of this invention is to provide a device for prerolling filter plugs to reduce them to a true circular configuration prior to their being attached to a length of cigarette rod.

A further object is to provide a device for turning cigarettes end for end to arrange all cigarettes so that the filter plugs all face in the same direction.

A further object is to provide a device for forming a column of sextuple length filter plugs above a fluted conveyor drum, so that each time a flute of the drum passes under the column it will receive a sextuple length of filter plug therein, which will allow any temporary hesitation in the supply of filter plug material to be evened out without interrupting the supply of filter plug material.

Another object is to provide an apparatus for subdividing rod shaped articles into equal subdivisions and then aligning the subdivision side by side in a single column.

Another object of this invention is to provide an improved method for forming hollow mouthpiece filter tip cigarettes.

Another object of this invention is to provide a plug severing device for subdividing multiple lengths of filter tip material into subdivisions of equal length.

Another object is to provide a method for cutting multiple lengths of plug material, whereby the subdivisions of each length may be changed without changing the position of the cutters.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

FIG. 2 is an end elevation, taken on line 2—2, of FIG. 1, illustrating a portion of the hopper, the plug receiving drum in conjunction with the cutting mechanism and the plug separating drums.

FIG. 3 is an end elevation, taken on line 3—3 of FIG. 1, showing the plug aligning drum.

FIG. 4 is an end elevation of the plug separating drums taken on line 4—4 of FIG. 2.

FIG. 7 is an end elevation of the tip material carrying suction drum, taken on line 7—7 of FIG. 6.

FIG. 8 is a partial sectional end elevation of a peripheral portion of the suction drum, taken on line 8—8 of FIG. 6.

FIG. 9 is a partial sectional end elevation of another peripheral portion of the suction drum, taken on line 9—9 of FIG. 6.

My filter tip attaching machine is adapted to be secured to the end of a cigarette making machine where the finished cigarettes F are discharged from the cut-off and spacing belt, such as that shown in U.S. Patent 2,247,413 issued to R. E. Rundell on July 1, 1941. Since the present filter tip attachment is capable of operating at the rate of 1,000 cigarettes per minute, or at a still higher, or lower speed if that should be desired, which are the approximate speeds of conventional cigarette machines in use today, there is no need for a manufacturer to buy new cigarette making machines to make filter tip cigarettes.

Figure 21:
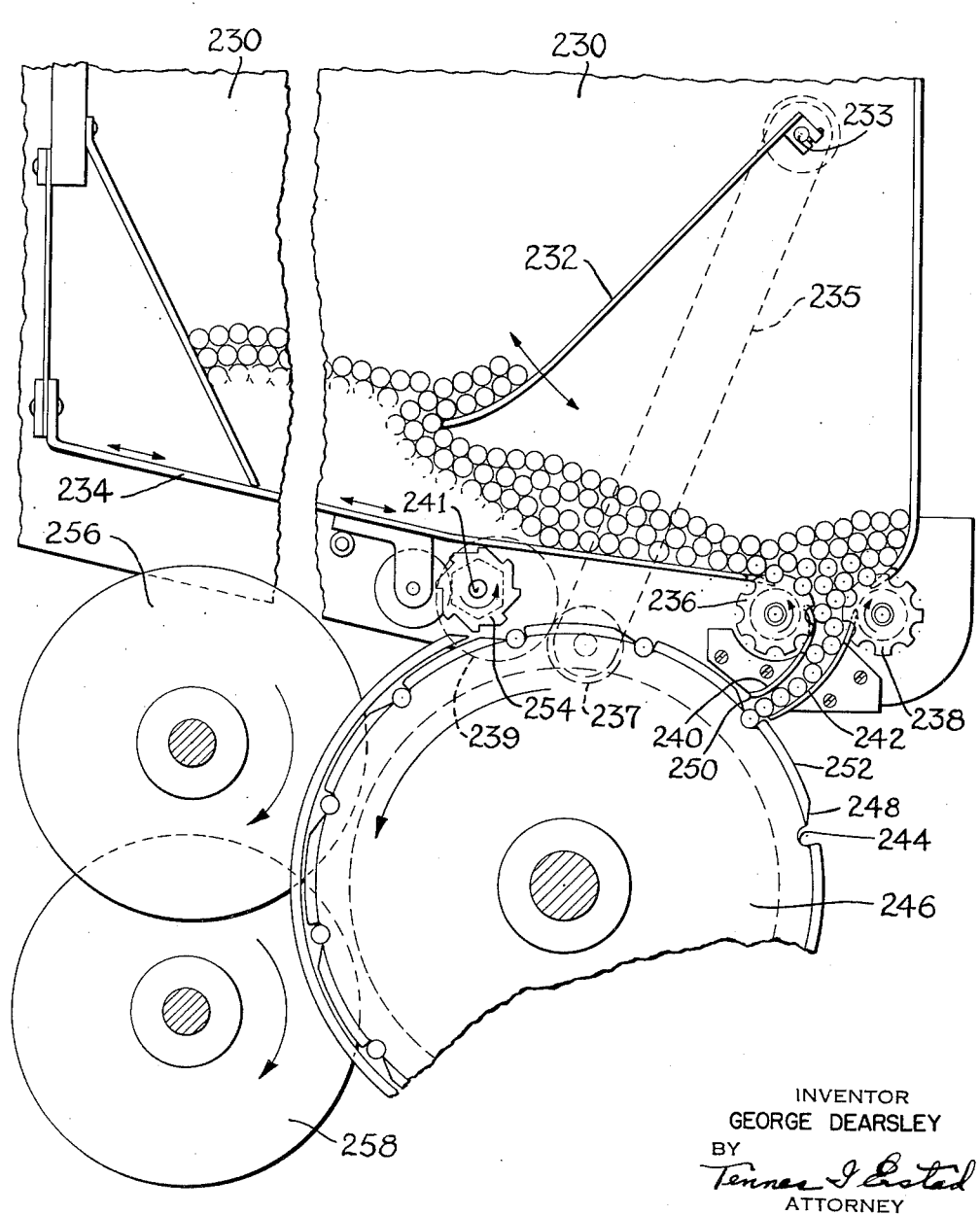
FIG. 21 shows another embodiment of an apparatus for separating and subdividing multiple lengths of rod-shaped articles into equal subdivisions.

My cigarette mouthpiece attaching apparatus consists of a mouthpiece hopper 10 into which a supply of sextuple lengths of mouthpieces are placed. Mouthpiece material is commonly purchased in sextuple lengths to facilitate handling. The embodiment of the mouthpiece cutting and aligning apparatus shown in FIG. 1 consists of the inclined floor plate 12 of the hopper and the slanted side gate 14 which are agitated or oscillated by means of a suitable vibrator. In this embodiment this is accomplished by the cam roller 16 engaging with the hexagonal rotating cam 18. FIG. 21 described hereinafter shows another means for oscillating the slanted side gate 14. The agitator floor plate 12 has a spring mounting 20 at one end which permits the plate to be readily agitated when the filter tip attachment is operated.

Figure 1:
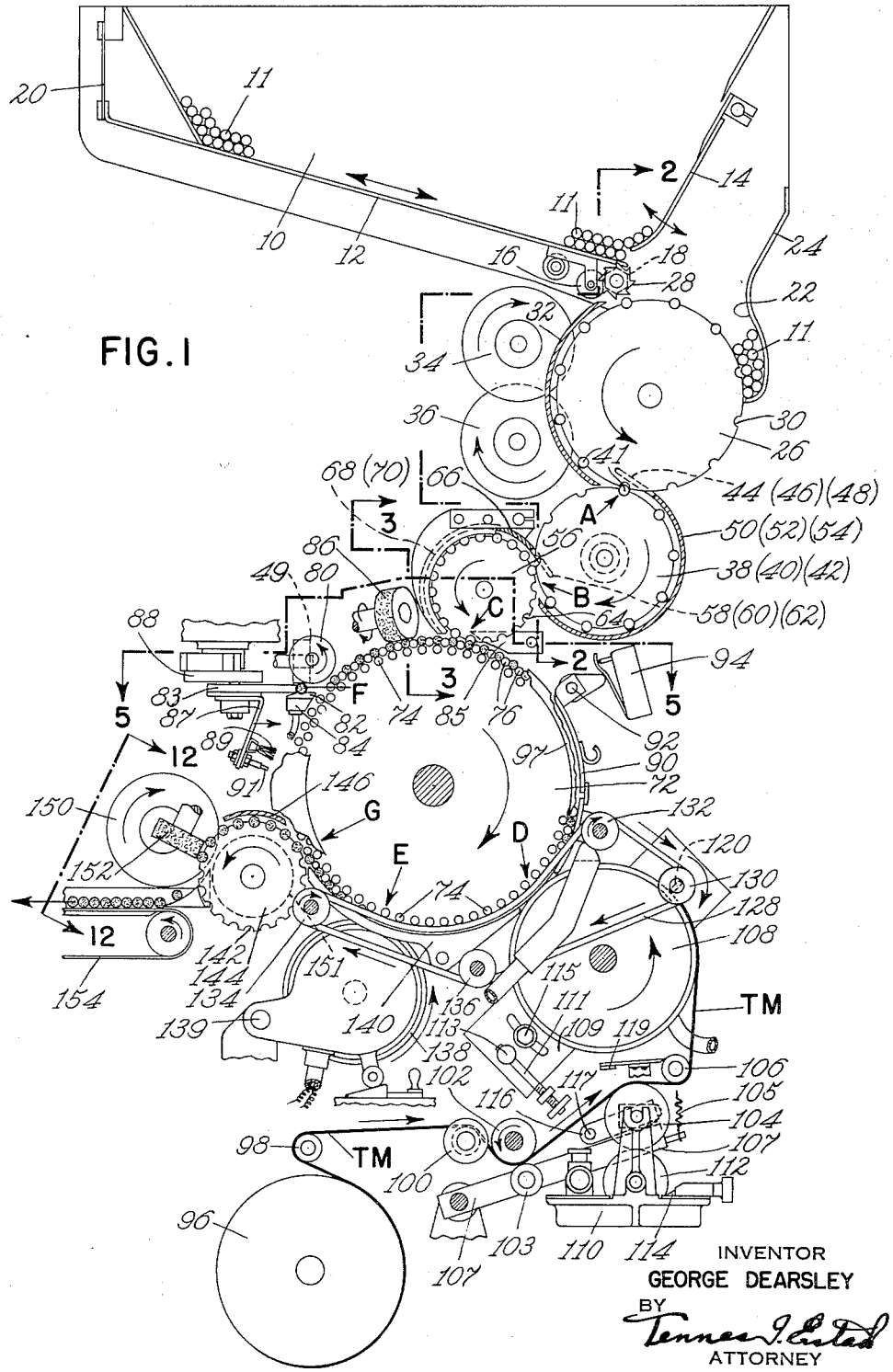
FIG. 1 is a side elevation, partly in section, illustrating the component parts of the cigarette filter tip mechanism.

The sextuple lengths of cigarette plugs 11 roll downwardly out through the space between the lower end of oscillating gate 14 and agitator floor plate 12 into the reservoir 22 made up of a side wall 24, a plug receiving and conveying drum 26 and the refuser wheel 28 (FIG. 1). The plug receiving and conveying drum 26 rotates in the direction indicated by the arrow and has plug receiving grooves 30 cut transversely across the periphery of the drum 26. As the drum 26 rotates and the grooves 30 pass under the reservoir 22 holding the sextuple lengths of filter plugs 11, an individual sextuple length of cigarette filter will fall under the action of gravity into each of the grooves or pockets 30.

In the event that two or more sextuple lengths of filter plug material partially fall into the same groove the rotating refuser wheel 28 pushes back the excess, so that only one sextuple length of filter plug is allowed to remain in each pocket 30 when it passes under the stationary, spaced retaining wall 32.

The refuser wheel 28 is so constructed that the teeth on the refuser wheel 28 rotate in timed relationship with the flutes or pockets 30, in such relative angular position that a moving face is always present to remove any filter plug which may otherwise jam against the filter already nested in grooves 30 of drum 26.

Suitable flexible side guides 33 and 33A are provided for urging each sextuple length of filter plug material up against the adjustable stop plates 31 and 35 (FIG. 2). The stationary guide members 31 and 35 may be moved in or out by means of a suitable screw adjustment 25 and 27 which can be set during the operation of the machine. By adjusting members 31 and 35, the lengths of the double length of filter plug material that is severed can be readily controlled.

As the drum 26 rotates in the direction indicated by the arrow, a first rotating disc knife 34, extending through a suitable slot (not shown) formed in the retaining walls 32 and into an annular groove 37 formed in the drum 26, severs a double length from the sextuple length of filter plug material as it passes between the flexible side guide 33 and the guide head 31.

As the plug receiving and cutting drum 26 continues its rotation, it brings the filter plug material between the flexible guide 33a and a second adjustable guide member 35. The flexible guide 33a urges the filter tip material up against the guide member 35. It will be noted in this connection that the filter tip material is always being measured for cutting from the same end.

By always measuring from one end of the material in this manner, the space occupied by the knife when severing is automatically allowed for, because the quadruple length is pushed into abutment with the double length and both sections are axially aligned with each other up against the guide member 35.

Since guide member 35 may also be adjusted in and out by means of its screw mounting 25, the point at which the second knife 36 severs the quadruple length may be readily set either when the machine is stopped or when the machine is running.

By this unique cutting arrangement the length of the middle section can be readily changed to accommodate a different sextuple length than was previously used with the machine. When a pair of knives are mounted to cut through a plug simultaneously it is impossible to vary the length of the center sections without relocating the cutting knives and changing the position of the annular grooves 37 and 39.

In other words, in this invention I relocate the plug material prior to each cutting operation, rather than the cutting knives. As a consequence it is easy when sextuple length plugs run a little long or a little short to spread the variance over the three cut lengths rather than have the variances all show up in the last or the first cut length. The second cutting knife 36 similarly extends through another groove or slot (not shown) formed in the retaining walls 32 and into an annular groove 39 of the drum 26. As mentioned, this knife 36 severs the quadruple length of filter tip material into two double length filter plugs as it passes between the side guide 33a and the other guide head 35.

As the drum 26 continues its rotation, the double lengths of filter tip material are held in the grooves 30 by means of the retaining plate 32 until they are brought above the pockets of the plug separating drums 38, 40, and 42 shown in FIGS. 1 and 2 which rotate in the direction indicated by the arrow, as shown in FIG. 1.

The double length filter plugs 41 are stripped from the cutting drum 26 by means of extensions 44, 46, and 48 of the double length retaining guide walls 50, 52, and 54. As the double lengths of filter plug travel on the plug separating drum 38, 40, and 42, they are circumferentially separated from one another by each of the plug separating drums 38, 40, and 42 rotating at a slightly higher rate of speed than its adjacent drum.

As a consequence when the three double lengths of cigarette plugs have passed from station A where they are all in axial alignment to transfer station B they will have all been moved out of axial alignment with each other due to the fact that the plugs advanced and carried by drum 38 rotate at a slower speed than the plugs supported in drums 40 and 42. The drum 40 rotates at a slower speed than drum 42 and, therefore, it will have advanced its double length plug a smaller distance than the drum 42.

In this manner the three double length filter plugs have been circumferentially spaced with respect to each other so that by the time they reach station B only one double length filter plug at a time will be stripped from its respective separating drum 38, 40, and 42 into a groove of a plug aligning drum 56 (FIGS. 1 and 3) which rotates in the direction indicated by the arrow. This stripping action is effected by the strippers 58, 60 and 62 which extend into suitable grooves 43, 45, 47 formed in the plug separating drums 38, 40, and 42.

As a consequence one double length filter plug is discharged into each of the pockets 64 of the plug aligning drum 56 (see FIGS. 1 and 3). As the plug aligning drum 56 carries the individual double length filter plugs around with it the double length filter plugs are held in their pockets by a suitable guide wall 66. As the double length filter plugs continue their rotation with the pockets 64, the ends of the double length filter plugs 41 come into engagement with the spaced plug aligning cams 68 and 70.

As the drum 56 continues its rotation in the direction indicated by the arrow, the double length filter plugs, because of their engagement with the aligning cams 68 and 70, are moved axially along the length of their respective pockets 64, so that by the time they reach station C they are all in the same position aligned in a row in side-by-side spaced relationship, as shown in FIG. 3. The plugs are then discharged by stripper 85 into suitable roller receiving pockets formed on the periphery of the assembly drum 72 in between two lengths of cut cigarette rod. Each pocket is made up of three pivoted rollers, a short roller 76 on either side and a longer inside roller 74.

The cut lengths of cigarette rod received from the cigarette making machine are spaced axially by suitable means such as speed-up roller 49 in a manner similar to that disclosed in U.S. Patent 2,124,397 granted to G. W. Gwinn et al. on July 19, 1938. A pair of suitable rubber rollers 80, shown in FIGS. 1 and 5, spaced from a stationary table bed 82 slow down the linear travel of the lengths of cigarette rod by engaging therewith. Suction is applied to the table 82 by means of a suction head 84 through which tobacco particles are withdrawn.

A kicker plate 83 is reciprocated in the direction indicated by the arrow by means of the crank 88 to push a pair of cut cigarette lengths F from between the retarding rollers 80 and the supporting table 82 into the pockets formed by the nest of rollers 74 and 76. The cigarettes so discharged, into the pockets of the cigarette assembly drum 72, are moved apart by means of a pair of rubber rollers 86 rotating in opposite directions, so that when the lengths of cigarette rod pass station C there will be sufficient space in between the cigarettes for the plug aligning drum to discharge its double length filter plug.

The cigarette assembly drum 72 rotates continuously in the direction indicated by the arrow, carrying with it the assembly of two spaced cigarette lengths and a double length filter plug located therebetween in the pockets formed by the rollers 74 and 76.

A guide bar 85 partially extends around and is spaced from the periphery of the path of rotation and employed for the purpose of properly seating the plugs between the cigarettes F in their respective pockets. A jam gate 90 is pivotally mounted on a suitable pivot 92 so that if more than one cigarette, filter stub or some other substance should manage to fall into the pockets formed by rollers 74 and 76 the excess pressure would lift up the jammed gate 90 which in turn would actuate a suitable micro switch 94 which would stop the cigarette making machine from operating.

Figure 5:
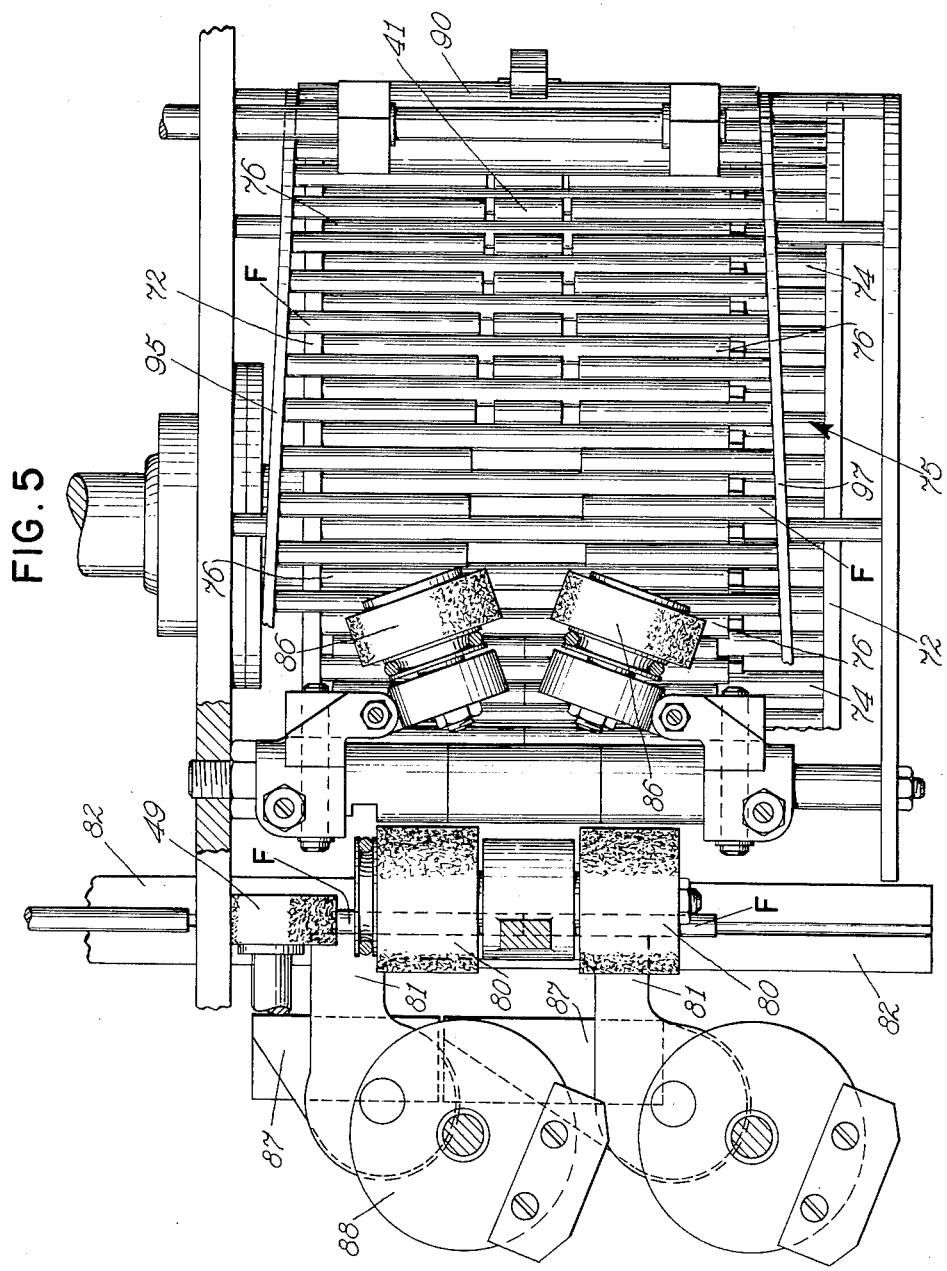
FIG. 5 is a plan view partially in section taken on line 5—5 of FIG. 1, illustrating a portion of the cigarette carrier drum in conjunction with the cigarette infeed and separating mechanism at the cigarette infeed station.
Figure 10:
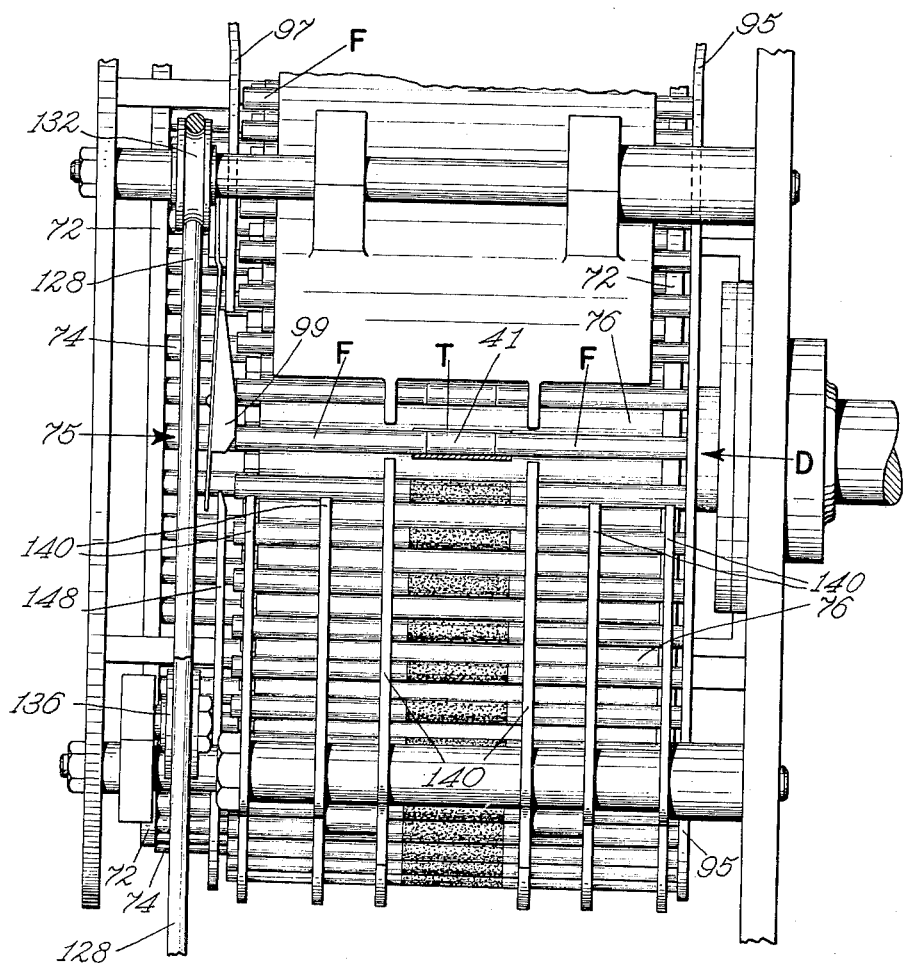
FIG. 10 is a partial end elevation of the cigarette carrier drum at the cigarette filter plug assembly station taken on line 10—10 of FIG. 6.

As the assemblies of double filter plugs and cigarette lengths continue their advance, they are gradually brought into abutment by means of a stationary guide 95 coacting with guide 97 as shown in FIGS. 5 and 10. The extreme end of the guide 97 is provided with a yieldable spring mounted guide shoe 99 which is employed for the purpose of achieving a firm abutment between the cigarette lengths and the double filter plugs.

The abutting cigarette lengths F and double length filter plug 41 are joined together by means of a uniting band T which is rolled around the assembly.

The uniting band material TM is fed from a reel 96 over pulleys 98 and 100 and between feed rollers 102 and 103 and over a paste applying roller 104 and around another guide roller 106 in the direction indicated by the arrows on to the band conveying suction drum 108. The feed rollers 102 and 103 are kept in constant engagement by a tension spring 105 connected to an arm 107 to which the feed roller 103 is pivoted. Adhesive material is stored in the glue pot 110 and is removed therefrom by a roller 112 which has excess paste trimmed therefrom by means of an adjustable scraper blade 114. The roller 112 engages with the paste applying roller 104 which transfers the glue on to the under side of the uniting band material TM.

In the event the filter tip attachment is stopped for any reason, the arm 116 carrying a band engaging extension 117 is elevated, lifting the uniting band material TM out of engagement with the glue applying roller 104 and into engagement with the stationary stop 119 so that the uniting band material will not adhere to the roller 104 and will be prevented from being pulled off the reel 96 by the movement of the suction drum 108 by reason of the fact that TM is gripped between extension 117 and stop 119.

The arm 116 simultaneously depresses the arm 107 thereby disengaging the feed roller 103 from the web TM and feed roller 102, thus effecting a stoppage of further feeding of the tip material TM.

Figure 6:
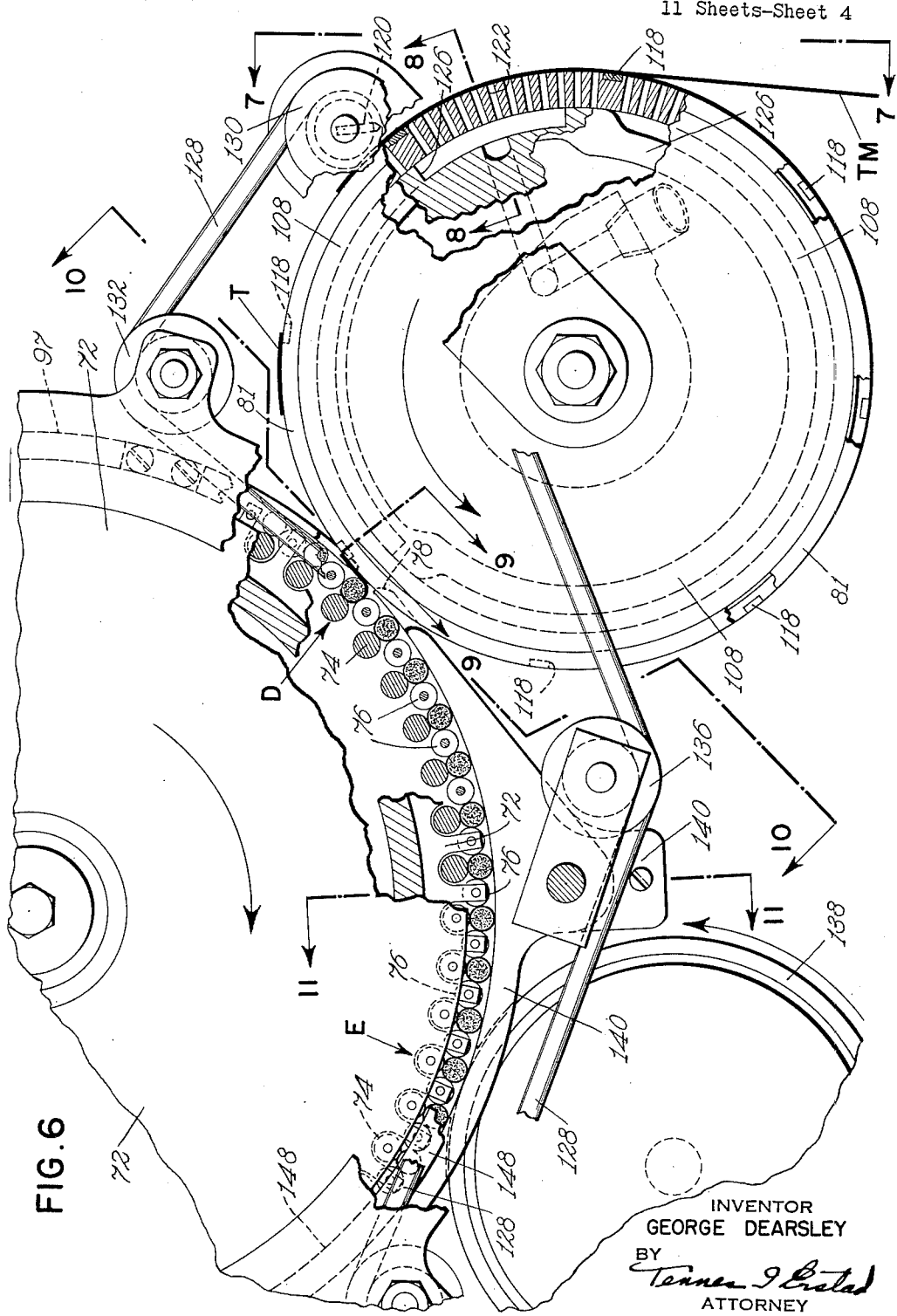
FIG. 6 is an enlarged side elevation, partly in section, of the cigarette filter plug assembly station illustrating a portion of the cigarette carrier drum in conjunction with the tip material carrying suction drum and cutting mechanism.

The drum 108 has metallic insert blocks 118 mounted at spaced intervals transversely across the periphery of the drum. These inserts 118 are so spaced as to serve as meeting blocks and be opposite to the rotating cutting knife 120 each time each block 118 passes this point, (see FIG. 6).

The suction drum 108 has a unique suction hole arrangement for holding the band or tip material in contact with the surface of the suction drum 108. It will be noted that the center suction holes 122 hold the cork tip material in contact with the drum 108, but there is a slippage that takes place between the suction drum 108 and the web TM due to the fact that feed drum 102 is driven at a slower peripheral speed than the drum 108 and the web slides on the drum 108.

As the material passes beneath the knife, the leading end of the tip material is severed to form a tip T. The latter, due to the higher speed of the tip drum 108, is carried to the tip applying station D and at the same time provides spacing between the tip T and the leading end of the tip material TM.

The suction drum 108 is supported by a plate 109 which is pivotally secured on the shaft of knife 120 and is adjustable by means of an adjusting spindle 111 engaging said plate 109 by means of a swivel stud 113. After setting, a suitable lock-on screw 115 is turned to hold the plate 109 in a secured position. By means of this arrangement it is possible to move the suction drum towards and away from the assembly drum 72 thus varying the degree of pressure exerted on the filter tip assembly during the uniting band applying operation.

It will be appreciated that while I have shown the suction drum supporting plate 109 as being pivotally mounted about the shaft of the cutting knife 120, both the cutting knife 120 and the suction drum 108 could be otherwise suitably mounted to obtain the same result. The important factor to be borne in mind is that the relationship of the cutting knife 120 with respect to the suction drum 108 should not be changed so as to interfere with the proper operation of the uniting band conveying drum and cutting knife.

It will be noted that the holes 124 are positioned adjacent the sides of the suction drum so as to provide a firm grip across the width of the web TM at the time it is being severed. A suction cut-off cam 126 is provided for cutting off suction from the center holes 122 as they pass the suction cut-off cam 126 thereby avoiding any unnecessary loss of suction.

It will thus be noted that the center holes 122 extend continuously around the center portion of the periphery of the drum 108 while the groups of side holes 124 are spaced circumferentially around the drum in accordance with the spacing required by the severed pieces of uniting band material.

After the center holes have passed the cutting station, the suction leading to this portion of the path of travel of the center holes is cut off while suction still is allowed to act upon the side rows of holes 124 which are covered by the severed tip T. It will be noted that the center holes are not all covered by the tip T because of the slippage and spacing of the cut tip T that is effected.

As the cigarette assembly drum 72 continues its rotation the inside rollers 74 have their projecting driving end 75 engage with the belt 128 which is driven from the drive pulley 130. The belt 128 passes over idler pulleys 132, 134, and 136. The section of belt between pulleys 132 and 134 is held in contact with the driven end 75 of the inside rollers 74 to impart rotary movement thereto. This has been found to be very desirable when operating at cigarette machine speed because by the time the cigarette assembly is about to have a uniting band applied thereto, it will already have begun to rotate and there will not be any sudden accelerations of the cigarette assembly at the moment the uniting band is brought into contact with the assembly. It also has the further advantage that the inside roller 74 does not have to be driven by the rubber rings 81 through the cigarette assembly which would subject the assembly to undesirable stresses and disrupt the arrangement of the tobacco filler therein.

The side rollers 76 are shorter than the inside roller 74 and also shorter than the assembled cigarette length to permit the side guides 95 and 97 to cam the components of each assembly together as shown in FIG. 5. By the time the assembled cigarettes reach station D they are held in tight abutting relationship by side guides 95 and guide shoe 99.

The severed length of cork tip material carried by the suction drum rotating in the direction indicated by the arrow is brought into contact with the assembly of tightly held cigarettes. The rubber belts 81 and the surface of the drum 108 engage the cigarette assembly and in cooperation with driven inside roller 74 positively rotate the cigarette assembly, causing the tip T to be rolled about the assembly, between the rollers 74 and 76, and the suction drum 108.

The stripping fingers 78 ride in the recesses 79 and beside the rubber belts 81 to lift the banded cigarette assembly away from the drum 108 and confine it in the cradle of rollers 74 and 76.

When the assembly of cigarettes having the cork tip T applied thereon reaches the sealing station E they come in contact with a heater drum 138 rotating in the direction indicated by the arrow, which causes the assembly of cigarettes to be rolled within the nest of rollers and the sealing drum 138 to set and dry the adhesive carried on the cork tip material. During this portion of travel the cigarettes are held in their pockets formed by rollers 74 and 76 by means of a suitable guide plate 140 and the inner rollers 74 are positively rotated by means of belt 128 to impart to the cigarette assemblies a rotation similar to that imparted before and during the application of the uniting band.

The heating drum 138 may be mounted in a manner similar to that which supports the suction drum 108, so that it can be moved towards and away from the assembly drum 72 so as to readily regulate the pressure exerted on the cigarette, when the machine is running, so as to obtain the type of seal desired.

When the assembled cigarettes reach the station G they drop into the pockets 142 of the cutting drum 144 which rotates in the direction indicated by the arrow. A confining plate 146 surrounds the upper portion of the periphery of the cutting drum 144 and holds the assembled cigarettes in their respective pockets 142. A side guide or plough 148 (FIG. 12) is employed to push the cigarettes up against a stationary stop 149 so as to bring the center of the double filter tip into the path of the rotating knife 150.

The knife 150 extends into an annular groove 151 formed in the cutting drum 144 so as to sever each assembly of cigarettes at their center into two filter tip cigarettes. When the cigarettes have been so severed a separating roller 152 engages with one of said severed cigarettes and pushes it axially away from the cutting knife along the groove 142, so as to provide a space between the severed cigarettes before they are discharged onto the catcher belts 154.

Every time the kicker plate 83 is moved forward it carries with it the arm bracket 87 which has on its ends a brush 89 and a finger 91. As the kicker plate completes its circulatory path of travel the brush and the finger will pass through a pair of adjoining spaced nests of rollers 74 and 76 on drum 72, clearing out any cigarettes or plug or tobacco material that might have remained in these nested roller holders.

Figure 17:
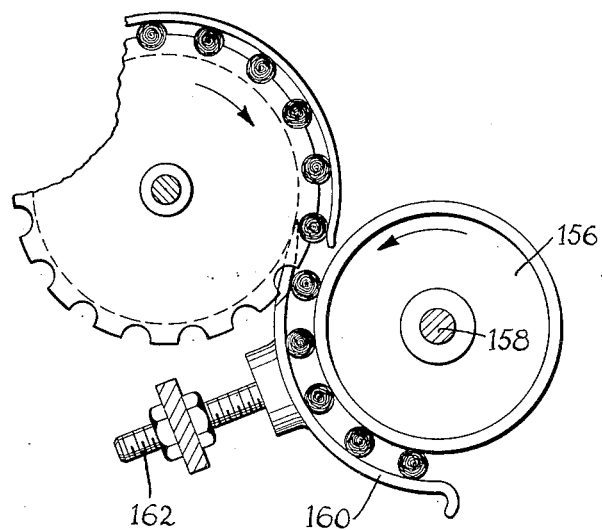
FIG. 17 is an end elevation illustrating a single drum coacting with a concave for prerolling filter plugs.
Figure 18:
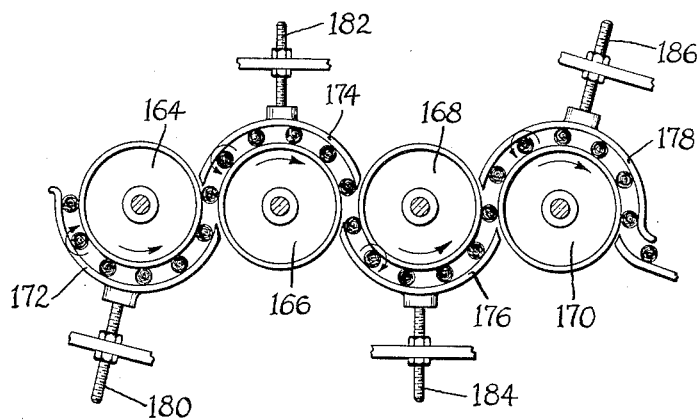
FIG. 18 is an end elevation illustrating a plurality of oppositely rotating drums for pre-rolling filter plugs.

In FIGS. 17 and 18 I have shown another embodiment of my filter tip apparatus, wherein provision has been made for pre-rolling the filter plugs so that they will have a true circular configuration and will be of the correct diameter.

It was found that one of the reasons why a poor joinder was obtained between the cigarette filler and the filter plugs was because the plugs differed greatly in their roundness and in their diameter from one another. Since these variations in plug diameter were often due to the characteristics of the plug material employed and also to the manner in which the plug material is shipped and stored, this problem had to be provided for to obtain satisfactory filter tip cigarettes.

In the embodiment shown in FIG. 17 a drum 156 is mounted on a rotating horizontal shaft 158 which is driven by suitable means (not shown) from the main drive of the cigarette making machine. The drum 156 is partially surrounded by a concave member 160 which is adjustably supported by a stub 162 held by a suitable bracket formed on the frame of the machine.

The mouthpiece material (which may be of sextuple length or any other desirable length) is deposited between the concave member and the roller at the upper portion of the concave from a suitable source of supply, such as the feed hopper 10 shown in FIG. 1. The rotating roller can be rotated continuously in one direction or oscillated if desired to impart a true cylindrical configuration or shape to the mouthpiece material, so that it will be of the desired diameter. The spacing between the drum 156 and the concave 160 may be adjusted by means of suitable screws 162 so as to make the mouthpieces of the diameter desired.

In the embodiment shown in FIG. 18, I have employed a plurality of rollers 164, 166, 168, and 170, each of which is partially surrounded by suitable concave members 172, 174, 176, and 178 arranged and spaced from their respective drums in such manner that as the plugs are advanced between one drum and concave, they will enter the space between the next adjoining drum and concave. When a plug is transferred from the space of one drum and concave to the space between the next drum and concave, the direction of rolling effected on the plug will be reversed.

The concave members 172, 174, 176 and 178 may be adjustably spaced from their respective drums by means of suitable adjusting studs 180, 182, 184, and 186.

When the plugs have been prerolled in the foregoing manner they are discharged into the reservoir 22. From this point on the procedure already described for cutting, conveying, assembling and uniting the components into a filter tip cigarette are followed.

Some manufacturers prefer to make filter tip cigarettes which have hollow mouthpieces formed at the ends thereof. Heretofore, such cigarettes were manufactured in machines known as stuffing machines. The usual stuffing system employs one machine to manufacture hollow, paper tubes complete with the desired type of mouthpiece. These complete tubes are then subsequently stuffed with filler tobacco in another machine. Machines of this type were obviously slow in operation and presented various problems with respect to attaining a uniform filling of the tobacco and also in attaining a desirable abutment between the filter plug material and the filler tobacco.

Figure 13:
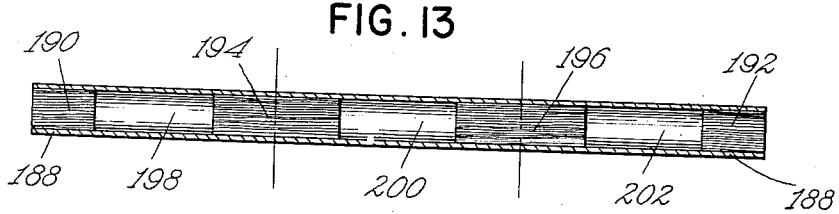
FIG. 13 is a sectional side elevation of a sextuple length length hollow mouthpiece filter plug.

In the present invention, I have disclosed a method and an apparatus for carrying the method into effect for making hollow mouthpiece cigarettes as shown in FIGS. 13–16. In FIG. 13 I have shown a sextuple length of hollow mouthpiece and filter tip material which is made up of a hollow cylindrical paper tube 188 wherein filtering material has been inserted at evenly spaced intervals. At the ends, the sextuple lengths of cigarette filter are severed across the filter material, so that the ends of the sextuple lengths of filter plug material have single length filter plugs 190 and 192.

The two center filter plugs 194 and 196 are of double lengths just like the spaces 198, 200, and 202. The sextuple lengths of composite hollow mouthpiece filter plug material shown in FIG. 13 are stacked in the hopper in the same manner as the filter plug material shown in hopper 10 of FIG. 1. These sextuple lengths of hollow mouthpiece filter plug material are fed from the hopper 10 into a suitable reservoir such as that shown in FIG. 1.

Figure 14:
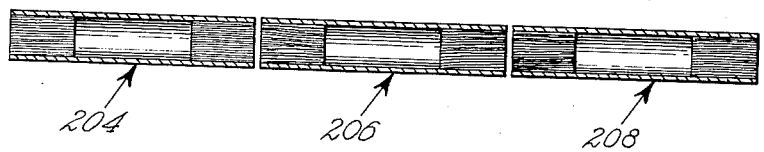
FIG. 14 is a sectional side elevation showing how a sextuple length hollow mouthpiece filter plug is severed into three double length hollow mouthpiece filter plugs.

From there the sextuple lengths of hollow mouthpiece filter plug material are received on the drum 26 which conveys them to a cutting station where they are cut transversely on the periphery of the drum into three double length hollow mouthpiece filter plugs 204, 206, and 208 as described heretofore and shown in FIGS. 1 and 14. Each double length of hollow mouthpiece filter plug material consists of single lengths of filter plug material mounted in opposite ends of the double length tube so that a double length of hollow space is located between the spaced single lengths of filter plug material.

The double length filter plugs are moved laterally relative to each other by plug separating discs 38, 40, and 42 and are arranged side-by-side in a column by means of the plug aligning drum 56 shown in FIG. 1. These double length hollow mouthpiece filter plugs are then discharged in the manner described heretofore onto the assembly drum 72. One of these composite double length filter plugs is deposited into each pocket so as to position filter plug material and hollow mouthpiece material between two cut cigarette lengths.

Figure 15:
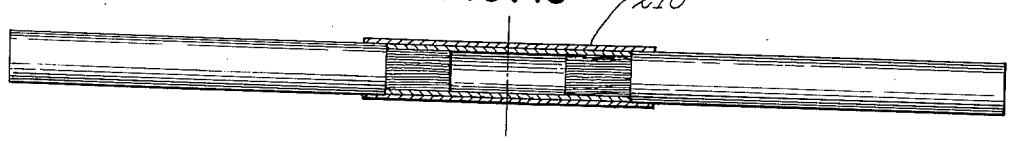
FIG. 15 is a sectional side elevation illustrating how a double length hollow mouthpiece filter plug is placed between two cigarettes and assembled by means of a cork band.

As the assembly is conveyed around by the assembly drum 72 in the manner heretofore described, a uniting band 210 is affixed to join the abutting cigarette lengths to the ends of the double length composite plug material in the manner shown in FIG. 15. Because cigarette lengths have been made by the machine in the manner to which the manufacturer is accustomed on his conventional cigarette making machine, the severed ends of the filter tip material are square and the abutting filter tip material which is similarly square will form a firm abutment between both elements so that when a uniting band is added there will be a firm abutment between the cigarette filler and the hollow mouthpiece filter plug.

Figure 16:
FIG. 16 is a sectional side elevation of a single cigarette with a hollow mouthpiece filter tip.

The united assembly is then carried to the cutting drum 144 where the double length hollow mouthpiece filter plug is severed across its center, making two hollow mouthpiece filter plug cigarettes of the type shown in FIG. 16.

Figure 12:
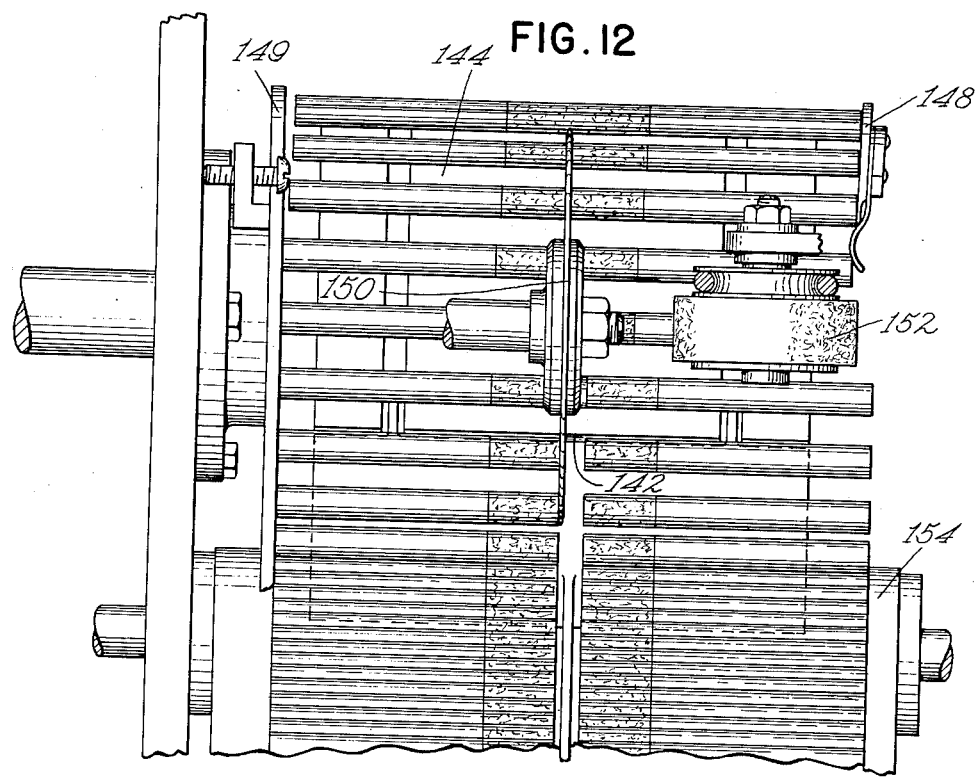
FIG. 12 is an end elevation of the cigarette cutting drum in conjunction with its separating means at the cigarette delivery station, taken on line 12—12 of FIG. 1.
Figure 11:
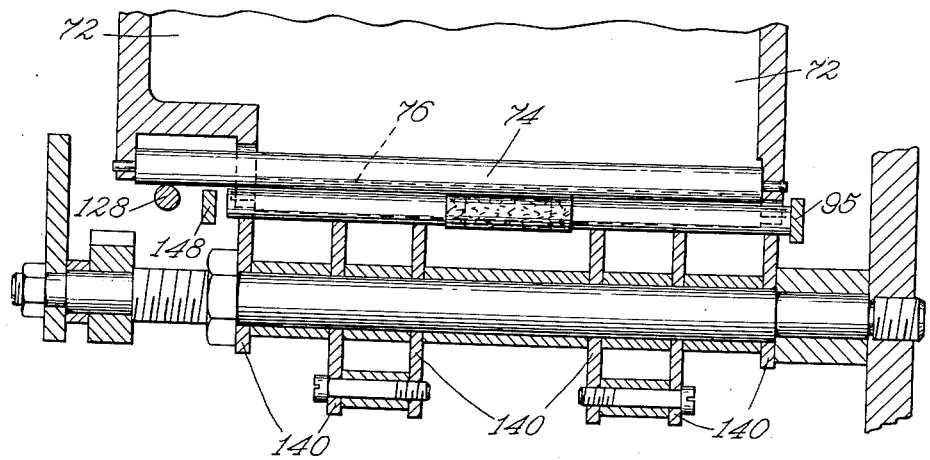
FIG. 11 is a partial sectional end elevation of a peripheral portion of the carrier drum in conjunction with the cigarette guiding means, taken on line 11—11 of FIG. 6.
Figure 19:
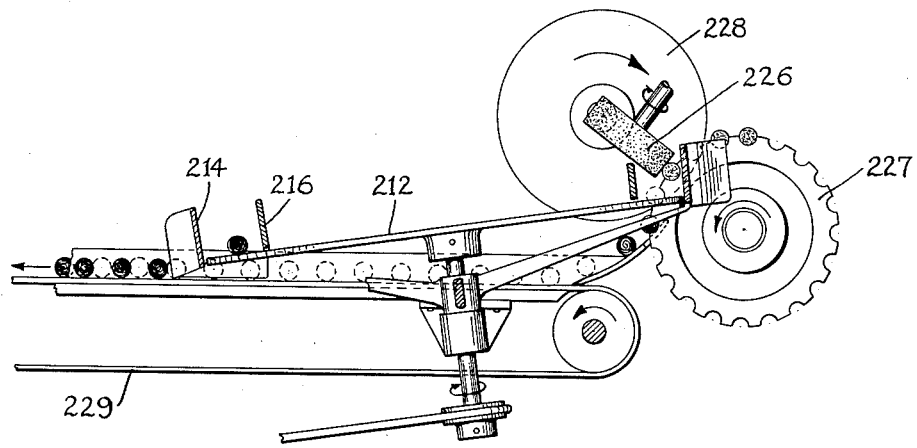
FIG. 19 is a side elevation illustrating a cigarette reversing mechanism at the delivery station of the filter tip machine.
Figure 20:
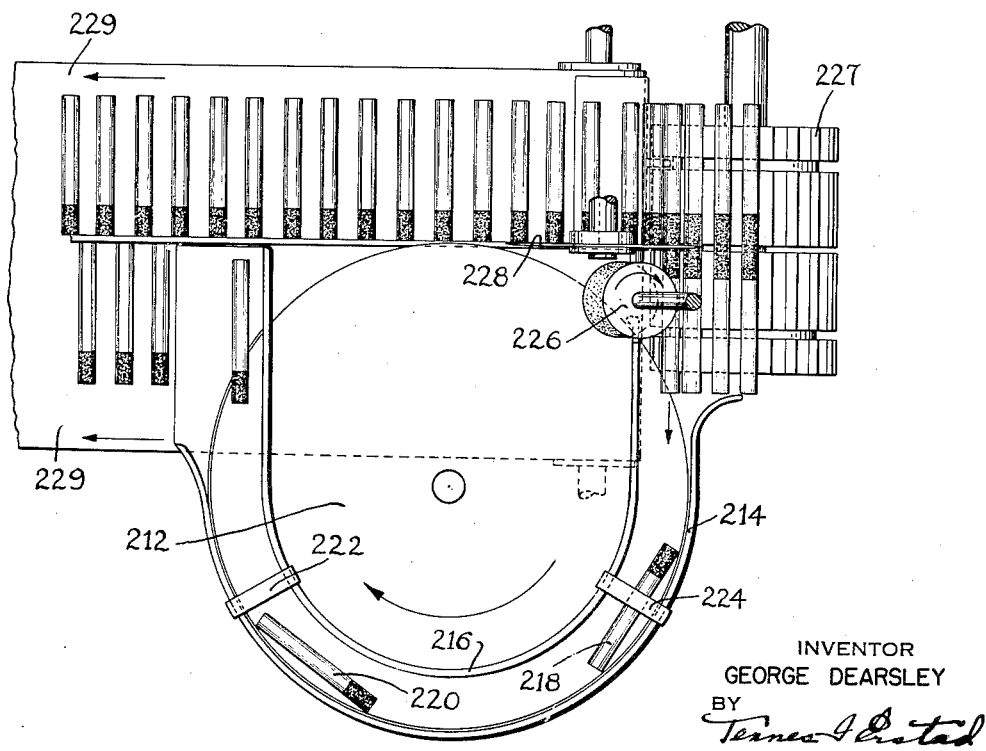
FIG. 20 is a plan view of the same.

When cigarettes are discharged from the cutting drum, as shown in FIG. 12 the filter plugs of the severed cigarette are facing each other. It is desirable that all the filter plug cigarettes have their filter plugs face in the same direction to facilitate packaging. To avoid the necessity of having an operator turn one row of cigarettes end for end, I have provided a device in FIGS. 19 and 20 which automatically turns the cigarettes end for end. This device is mounted adjacent to the cutting drum shown in FIG. 19, and comprises a disc 212 which rotates in the direction of the arrow as shown in FIGS. 19 and 20. The disc has a pair of spaced stationary walls 214 and 216, shown in FIG. 20, to confine cigarettes 218 and 220 resting on the disc to travel around with the disc between the walls 214 and 216. Upper braces 222 and 224 are provided for maintaining said guide walls at a fixed relationship to each other.

When the severed cigarettes reach the rotating rubber roller 226 after passing under the cutting knife 228, they are discharged in the direction indicated by the arrow on to the disc 212. After the cigarettes have been conveyed around the circular path of travel by the disc 212 they are discharged onto the collecting belt 229 as shown in FIG. 20, and all of the cigarettes have their filter ends facing in the same direction.

While I have shown the disc 212 arranged at an incline, if desired this disc could be arranged horizontally to allow the cigarettes to fall or slide down a chute onto the collecting tape 229.

Another embodiment of a plug feeding apparatus has been disclosed in FIG. 21. This embodiment is particularly desirable at high speeds if it is found that plugs tend to bridge and avoid falling into the pockets of a receiving drum. In the structure shown in FIG. 21 the sextuple filter lengths are placed in a suitable hopper 230 which is somewhat similar to the hopper 10 shown in FIG. 1 and the components that obviously correspond to each other are not specifically identified in the present embodiment since reference can be made to FIG. 1 for a more detailed description of these components.

The metering agitator flap 232 is mounted on a shaft 233 which is oscillated by means of a cam lever 235, carrying on its free end a cam roller 237. The cam roller 237 engages with a suitable cam 239 mounted on the continuously rotating shaft 241 to which is also secured the refuser 254.

The adjustable flap 232 meters the desirable amount of filters from the bulk supply hopper 230 while the vibrating bottom plate 234 controls the flow of the metered quantity of sextuple filter lengths and conveys them to the counter rotating rollers 236 and 238.

The bottom vibrating plate 234 extends up to the roller 236. Each of the rollers 236 and 238 are deeply grooved and timed, with a tooth on one opposite to the groove on the other roller, as shown in FIG. 21. These rollers 236 and 238 rotate in opposite directions at the same speed so that the tooth relationship is maintained at all times, the objective being to provide a gap through which only one filter may pass at a time, which gap rapidly oscillates in a horizontal plane in order to facilitate the passage of the filters through the gap.

The oscillating flap 232 is employed to maintain a suitable "head" of sextuple length filters over the rollers 236 and 238 at all times without permitting the weight of the bulk of the filters in hopper 230 to press on the region where the filters are separated into single file. It has been found in the arrangements just described that the sextuple length filters never tend to bridge over the rollers 236 and 238 but are sufficiently agitated to circulate freely and flow into single file without interruption.

Once the sextuple length filters pass between the rollers 236 and 238 they are held in the single file formation by the guides 240 and 242 which also act as a reservoir so that even if the flow is temporarily interrupted filters are available to fall into the flutes 244 of the drum 246 as required. The drum 246 is made in three parts as shown in FIG. 21 to allow the two circular knives 256 and 251 to sever each sextuple length filter plug material into three equal double lengths of filter material while being moved forwardly in the grooves 244. Because of this, the grooves 244 must support the filters for at least half of their circumference in order that the filter plug not be flattened by the stress imposed when undergoing cutting by the knives 256 and 258. This consequently imposes limitations on the shape of the groove and the lead into it.

It has been found that the shape of the groove as shown in FIG. 21 satisfactorily accomplishes this objective. It will be noted that the angle of the lead 248 into the groove 244 is related to the rate at which the plugs fall so that the angular lead 248 is so shaped as to obtain the maximum velocity of the filters towards the center of the drum 246 at the point where the angular lead 248 joins the half round groove 244 so that the filters move continuously with a constant acceleration toward the center of the drum 246 from the beginning of the lead 248 until they are delivered.

It will also be noted that the shape of the channel formed by the guides 240 and 242 is such that the falling plugs have a component of movement in the direction of the moving drum 246. The shape of the curvature of the lower extremity 250 of guide 240 is also of considerable importance. This must be so shaped as to efficiently retain the filters while the plain portion 252 of the drum 246 is passing under the row of filters and yet as soon as the filters start to move towards the center of the drum 246 by sliding down the angular lead 248, the curved end 250 of guide 240 must exert a component force on the filter towards the center of the drum 246 by reason of tangential force applied by the friction of the moving drum 246 and so aid accelerating the filter towards the bottom of the groove 244.

The refuser 254 prevents jamming of the mechanism by any filter that is displaced and is not properly seated in the groove 244. It is found that in this event the surplus or damaged plug is refused by the roller 254 where it can be removed manually, thereby permitting the mechanism to continue running without allowing the surplus filter to be dragged into the mechanism and to cause trouble.

To simplify the illustration of the foregoing invention I have omitted showing the various drives for the component parts since these components can be driven in synchronism with each other, and with the cigarette machine to which my attachment is secured, in any suitable manner such as by gears or by sprockets and sprocket chains.

In the foregoing disclosure it will be understood that while reference has been made to filter plugs, this invention is also equally adaptable for use with other cylindrical mouthpieces that may not necessarily have any filtering action.

Therefore, as used herein, the term "mouthpiece" signifies solid filters, multiple filters and hollow filters.

The invention hereinabove described may be varied in construction within the scope of the claims, for the particular device selected to illustrate the invention is but one of many possible embodiments of the same. The invention, therefore, is not to be restricted to the precise details of the structure shown and described.

I claim:

1. Apparatus for making filter tip cigarettes in which cigarettes are received from a cigarette making machine which axially discharges cut lengths of cigarette rod, the apparatus comprising means for axially spacing said cut lengths of cigarette rod as they travel axially, means for laterally displacing pairs of said axially spaced lengths of cigarette rod, a rotating assembly drum for receiving each pair of laterally displaced lengths of cigarette rod, means positioned adjacent said assembly drum for separating said spaced lengths of rod from each other while supported on said drum, means for cutting a multiple length filter plug into double length filter plugs, a filter plug feed for delivering a double length filter plug from said cutting means to the space between said spaced lengths of cigarette rod, guides for moving said spaced lengths of rod into axial abutment with the ends of said double length filter plug, means for rotating said abutting lengths of rod and filter plug, a tip applier for joining the ends of said rod to said double length filter plug by means of tip material, and means for severing said double plug through the center to form two filter tip cigarettes.

2. Apparatus for making filter tip cigarettes comprising means for receiving cigarettes being discharged by a cigarette making machine discharging cut lengths of cigarette rod axially, members for deflecting pairs of said axially discharged cigarettes laterally, an assembly drum having pockets for receiving each pair of cigarettes as they are deflected laterally by said deflecting members, means for axially separating the individual cut lengths of cigarette rod supported in said pockets, means for cutting a multiple length filter plug into double length filter plugs, a plug feed means for receiving a double length filter plug from said cutting means and for positioning a double length filter plug in the space between said axially spaced cut lengths of cigarette rod, means for bringing the ends of said cut lengths of cigarette rod into abutment with the ends of said double length filter plug, means for rotating the cut lengths of cigarette rod and filter plug, means for applying a uniting band about said double length filter plug and a portion of the end of said cut lengths of cigarette rod abutting said double length filter plug to join them together, and means for severing said double length filter plug across its center to form two filter tip cigarettes.

3. An attachment for a cigarette making machine comprising means for securing said attachment adjacent the end of a cigarette machine where cut lengths of cigarette rod are discharged axially, means for stopping the axial travel of said rods and for laterally deflecting pairs of said spaced lengths of cut rod, a conveying drum having pockets for receiving each pair of cut lengths of cigarette rod as they are deflected laterally by said deflector, a pair of rubber rollers mounted adjacent to the path of travel of said main drum and traveling in directions opposite to each other to axially separate the cut lengths of cigarette rod from each other to make room for a double length of filter plug material therebetween, a conveyor for delivering a double length of filter plug material in between said separated lengths of cut cigarette rod, guides positioned to move said cut lengths of cigarette rod into abutment with the ends of a double length filter plug, a tipping material applier for applying a section of tip material around said abutting assembly of cut lengths of cigarette rods and double length filter plug while on said conveying drum, and means for severing said double length filter plug across its center to form two filter tip cigarettes.

4. A filter plug machine comprising a conveyor drum having transverse pockets mounted in spaced relationship around the periphery of said drum, means for mounting said drum at the end of a cigarette making machine closely adjacent to the area where cut lengths of cigarette rod are discharged from the cigarette making machine, a deflecting device having a translatory path of movement for laterally deflecting pairs of cut lengths of cigarette rod as they are discharged from the end of the cigarette making machine to which said conveyor drum is attached, a brake associated with said deflector for stopping the axial travel of said cut lengths of cigarette rod, a brush and pin connected to and actuated by said deflecting device to move said pin and brush lengthwise through adjoining transverse pockets to remove any tobacco, cigarettes or other foreign matter that may have become lodged in said pockets each time said deflector is operated to assure the pockets are clean before arriving at the station for receiving cut lengths of cigarette rod.

5. A filter tip attachment for a cigarette making machine comprising means for deflecting pairs of axially fed cut lengths of cigarette rod laterally, an assembly drum having transverse pockets mounted on the periphery thereof, means for rotating said assembly drum in time with said deflectors to receive a pair of sidewise deflected cigarettes into each pocket of said drum, a pair of oppositely rotating members spaced above said drum for moving each pair of cigarettes deposited thereon axially away from each other to provide a plug receiving space therebetween, a pre-rolling drum for rolling a double length filter plug into a true circular configuration, means for delivering said pre-rolled filter plugs into the space between said cut lengths of cigarette rod, means for causing said cut lengths of cigarette rod to be moved into axial abutment with the ends of the double length filter plug, a uniting band applying device for wrapping a uniting band around said filter plug and the abutting end of a cut length of cigarette rod to unite the same together, said band applying device including means for rotating the filter plug and the cut length of cigarette rod to apply the band and means for severing said double length filter plug across its center to form two filter tip cigarettes.

6. A filter tip attachment for a cigarette machine comprising an assembly drum having pockets transversely mounted on the periphery thereof, a deflector for laterally deflecting pairs of cut lengths of cigarette rod discharged axially from said cigarette making machine into the pockets of said assembly drum, mechanism for axially separating each pair of cut lengths of cigarette rod after they have been delivered to said pockets to form a plug receiving space therebetween, means for cutting a multiple length filter plug into double length filter plugs, means for delivering double length filter plugs from said cutting means into said spaces, guides for bringing said cut lengths of cigarette rod into axial abutment with the ends of said double length filter plug, a uniting band applying device for applying a uniting band completely around each filter plug and the abutting ends of said cut lengths of cigarette rod while on the assembly drum, means for severing each aligned united assembly at the center to form two filter tip cigarettes, and a turn around device for turning one of said severed cigarettes end for end as it is delivered on to a collecting tape to line all the tips up on the collecting belt in the same direction.

7. A filter tip attachment for a cigarette machine comprising an assembly drum having pockets transversely mounted on the periphery thereof, a deflector for laterally deflecting pairs of cut lengths of cigarette rod discharged axially from said cigarette making machine into the pockets of said assembly drum, mechanism for axially separating each pair of cut lengths of cigarette rod after they have been delivered to said pockets to form a plug receiving space therebetween, means for cutting a multiple length filter plug into double length filter plugs, means for delivering double length filter plugs from said cutting means into said spaces, guides for bringing said cut lengths of cigarette rod into axial abutment with the ends of said double length filter plug, a uniting band applying device for applying a uniting band about each filter plug and the abutting ends of said cut lengths of cigarette rod while on the assembly drum, an aligning guide, means for pushing one end of each of said united assemblies up against said guide to line up all of the assemblies, means for severing each aligned united assembly at the center to form two filter tip cigarettes, and a turn around device for turning one of said severed cigarettes end for end as it is delivered on to a collecting tape to line all the tips up on the collecting belt in the same direction.

8. A filter tip attachment for a cigarette machine comprising an assembly drum having pockets transversely mounted on the periphery thereof, a deflector for laterally deflecting pairs of cut lengths of cigarette rod discharged axially from said cigarette making machine into the pockets of said assembly drum, mechanism for axially separating each pair of cut lengths of cigarette rod after they have been delivered to said pockets to form a plug receiving space therebetween, a plug rolling member for imparting a true cylindrical shape to each filter plug, means for cutting said rolled filter plug into double length filter plugs, and for delivering one of said rolled double length filter plugs from said cutting means into said spaces, guides for bringing said cut lengths of cigarette rod into axial abutment with the ends of said double length filter plug, a uniting band applying device for applying a uniting band about each filter plug and the abutting ends of said cut lengths of cigarette rod while on the drum, an aligning guide, means for pushing one end of each of said united assemblies up against said guide to line up all of the assemblies, means for severing each aligned united assembly at the center to form two filter tip cigarettes, and a turn around device for turning one of said severed cigarettes end for end as it is delivered on to a collecting tape to line all the tips up on the collecting belt in the same direction.

9. A feed for uniting bands comprising a reel of uniting band material, a uniting band feed for feeding band material at a predetermined rate from said reel, a paste applying drum for applying paste to one side of the tape after it is drawn from said reel, a uniting band conveying drum having a series of suction holes formed therein for receiving the leading end of said uniting band material, a cut-off knife coacting with said conveying drum for severing a uniting band of predetermined length from the leading end of said material, said uniting band conveying drum being adapted to rotate at a faster rate than said uniting band feed to move the severed section of uniting band material away from the leading end of the tape, means for applying suction to said drum to hold the leading end of the band material in contact therewith while allowing slippage to occur between the leading end of the material and the suction drum to permit the severed uniting band to be spaced from the leading end of the tape material, a tape lifting roller for moving the uniting band out of contact with the paste applying drum as desired or when the machine is stopped and means for gripping said uniting band to prevent said uniting band from being fed when it is out of contact with said paste applying drum.

10. A feed for uniting bands comprising a reel of uniting band material, a uniting band feed for feeding band material at a predetermined rate from said reel, a paste applying drum for applying paste to one side of the tape after it is drawn from said reel, a uniting band conveying drum having a series of suction holes formed therein for receiving the leading end of said uniting band material, a cut-off knife coacting with said conveying drum for severing a uniting band of predetermined length from the leading end of said material, said uniting band conveying drum being rotatable at a faster rate than said uniting band feed to move the severed section of uniting band material away from the leading end of the tape, means for applying suction to said drum to hold the leading end of the band material in contact therewith while allowing slippage to occur between the leading end of the material and the suction drum to permit the severed uniting band to be spaced from the leading end of the tape material, a pivot mounting for the feed roller for moving it out of engagement with the tip material as desired or when the uniting band conveying drum is stopped and means for gripping said uniting band to prevent said uniting band from being fed when it is out of contact with said paste applying drum.

11. A feed for uniting bands comprising a reel of uniting band material, a uniting band feed for feeding band material at a predetermined rate from said reel, a paste applying drum for applying paste to one side of the tape after it is drawn from said reel, a uniting band conveying drum having a series of suction holes formed therein for receiving the leading end of said uniting band material, a cut-off knife coacting with said conveying drum for severing a uniting band of predetermined length from the leading end of said material, said uniting band conveying drum being rotatable at a faster rate than said uniting band feed to move the severed section of uniting band material away from the leading end of the tape, means for applying suction to said drum to hold the leading end of the band material in contact therewith while allowing slippage to occur between the leading end of the material and the suction drum to permit the severed uniting band to be spaced from the leading end of the tape material, a tape lifting roller for moving the uniting band out of contact with the paste applying drum as desired or when the machine is stopped means for gripping said uniting band to prevent it from being fed when it is out of contact with said paste applying drum, a pivot mounting for the feed roller for moving it out of engagement with the tip material as desired or when the uniting band applying drum is stopped, and means for interconnecting the tape lifting roller and the feed roller with each other so as to automatically actuate the other whenever one of said elements is moved.

12. Apparatus for applying uniting bands to a composite assembly of axially aligned cigarette lengths and filter plugs comprising, an assembly drum for carrying composite assemblies to a uniting band applying station, a suction drum for conveying uniting bands to said uniting band applying station, said assembly drum having spaced rollers supporting composite assemblies of cigarette lengths and filter plugs, rubber rings mounted on the sides of said suction drum for engaging with and positively rotating a composite assembly when a uniting band is brought into contact therewith to apply a uniting band about the composite assembly to join the filter plug to the adjoining cigarette length.

13. Apparatus for making filter tip cigarettes comprising an assembly drum, spaced rollers which are shorter than the assemblies of cigarette lengths and filter plugs to which uniting bands are to be applied, each roller being spaced from the adjoining roller a distance slightly larger than the diameter of a cigarette to support a composite arrangement of cigarette lengths and filter plugs therebetween, another roller inside and off-set with respect to each pair of rollers and being longer than the composite assembly of cigarette lengths and filter plugs to form with said spaced rollers a cradle for said composite assembly to support the same around approximately 180° of the sides of the assembly, means for rotating the inside roller prior to and during the time when uniting bands are brought into engagement with the composite assembly to join the filter plug to the abutting cigarette filter length and a suction drum for conveying the uniting band to the assembly and rotating the assembly when the inner roller is substantially opposite to the suction drum to rotate the composite assembly of cigarette lengths and filter plugs and apply the uniting band about the assembly.

14. A uniting band conveying drum comprising a drum having a plurality of suction holes formed into the surface thereof for holding uniting band material in contact therewith, rubber rings formed around the side of the periphery of said suction drum for positively engaging and rotating composite assemblies of cigarettes when brought into engagement therewith by the pockets of an assembly drum to cause a uniting band to be applied to the assembly during the rotation thereof, and grooves formed around the periphery of said drum to permit stripping fingers to extend therein at the point immediately succeeding the position at which the uniting bands are applied to the composite assembly to positively engage and retain united assemblies in their corresponding pockets on the assembly drum.

15. Apparatus for making filter plug cigarettes comprising an assembly drum having rollers mounted side-by-side around the periphery of said drum and spaced from each other a distance slightly larger than the diameter of a cigarette, means for delivering pairs of cigarettes to said assembly drum, means for axially spacing these pairs of cigarettes from each other, an inner roller positioned adjacent each pair of cigarette receiving rollers for limiting the distance said cigarettes can descend into each pocket of rollers, means for delivering a double length filter plug between the spaced cigarette lengths, means for bringing said spaced lengths of cigarette filler into abutment with the double length of filter plug material, means for moving said assembly drum to bring said abutting lengths of double length filters and filter length material into engagement with a uniting band conveying drum, means for rotating said inner roller, and means for mounting said uniting band conveying drum for lateral movement towards and away from the assembly drum to permit the amount of pressure exerted on the composite length of cigarette filter plug material and cigarette length to be adjusted.

16. Apparatus for applying uniting bands to an assembly of cigarette filter lengths and filter plugs comprising a suction band conveying drum, a reel of continuous band material, feed rollers for positively feeding band material from said reel to said suction conveying drum, an adhesive applying roller for applying adhesive to one side of said uniting band material as it is feed to said suction wheel, an incapacitating device for stopping said feed rollers from feeding band material from said reel as desired or whenever the filter plug machine is stopped, a member for simultaneously lifting said band material away from the adhesive applying drum whenever said feeding rolls are incapacitated and moving said band material up against a stop to grip said band and to prevent said suction conveying drum from pulling off web material directly from the reel.

17. An attachment for making filter tip cigarettes comprising means for mounting said attachment on the end of a cigarette making machine, a deflector for laterally deflecting pairs of cut lengths of cigarette rod, an assembly drum for receiving said pairs of cut lengths of cigarette rod, a plug feed for depositing a double length filter plug in between the cut lengths making up each pair, means for bringing said cut lengths into close abutment with the ends of said double length filter, a suction drum for conveying lengths of uniting band material to a uniting band applying station to apply the uniting band about each assembly carried by said assembly drum, a reel of uniting band material, feeding rollers for continuously removing material from said reel and forwarding the leading end thereof to said suction drum, a paster for applying adhesive to said uniting band material as it is fed towards said suction drum, a uniting band elevating mechanism which may be used to lift said band out of engagement with said adhesive applying drum each time said assembly drum is stopped, or as desired and a fixed stop against which said elevating mechanism moves said band material to grip said band and to prevent band material from being pulled off said reel by said suction drum.

18. Apparatus for making filter tip cigarettes comprising an assembly drum, having spaced rollers which are shorter than the assemblies of cigarette lengths and filter plugs to which uniting bands are to be applied, each roller being spaced from the adjoining roller a distance slightly larger than the diameter of a cigarette to support a composite arrangement of cigarette lengths and filter plugs therebetween, a third roller off-set with respect to each pair of rollers and being longer than the composite assembly of cigarette lengths and filter plugs to form a cradle for said composite assembly to support the same around approximately 180° of the sides of the assembly, means for delivering an assembly of cut lengths of rod and mouthpieces to said cradle, means for delivering a uniting band to said assembly to unite said mouthpieces to said cut lengths of rod, traveling heat sealing means for applying heat to set the adhesive in the uniting band wrapped around the assembly, and means for rotating the inside roller prior to and during the time said assemblies with the uniting bands applied thereabout are brought into engagement with the traveling heat sealing means.

19. Apparatus for uniting mouthpieces to lengths of cigarette rod comprising an assembly drum, rollers spaced from each other and mounted transversely around the periphery of said assembly drum, an inner roller spaced inwardly from each pair of rollers and having the axis thereof extending parallel to the axis of the rollers on the periphery of said assembly drum, said inner roller having one end thereof extending beyond the distance said periphery rollers extend, means for positioning cut lengths of cigarette rod and mouthpiece material in the spaces between said rollers to form assemblies of mouthpiece cigarettes, guides for bringing the components of each assembly into abutment with each other, a drive for said assembly drum for moving said assembly to a uniting band applying station, a uniting band conveyor for engaging each cigarette assembly and applying a uniting band thereabout, driving means engaging with the extension of said inner rollers prior to the time a cigarette assembly, carried in the space between the rollers, comes into engagement with said band applier to impart a rotary movement to the assembly prior to its being brought into contact with the uniting band and during the time said uniting band is being applied to said assembly by said uniting band conveyor.

20. Apparatus for conveying uniting bands to assemblies of cigarettes carried by an assembly drum, said apparatus comprising a uniting band conveying drum, an adhesive applying roller, a continuous source of uniting band material, a feed drum for feeding uniting band material from said source, a second roller for holding said uniting band firmly against said feed drum to impart feeding movement thereto, a uniting band elevating member positioned between said adhesive applying roller and said feed drum on one side of said uniting band material, a stop positioned on the other side of said uniting band material and substantially transverse to the path of movement of said band elevating member, said band elevating member being movable to lift the band out of contact with said adhesive applying roller and into contact with said stop when said uniting band conveyor is stopped, said uniting band being adapted to be gripped between said stop and said elevating member.

21. Apparatus having the features provided for in claim 20 wherein means are provided for interconnecting said uniting band elevator with said second roller to move said second roller out of feeding position to prevent said uniting band material from being fed when the uniting band material has been lifted out of contact with the adhesive applying roller.

22. Apparatus for securing cigarette mouthpieces to assemblies of cut lengths of cigarette rod comprising, an assembly drum, guides for moving the components of each assembly into contact with each other as said assembly drum rotates, a uniting band conveyor for delivering a uniting band to an assembly and securing the uniting band thereto, a traveling heated member pivotally mounted with respect to said assembly drum for applying heat to the assemblies joined together by said uniting bands to set the adhesive therein, and means for pivotally mounting said heat applying member so that the amount of pressure exerted on the assembly can be regulated which will permit the heated roller to be moved out of contact with the assembly whenever this is desired.

23. Apparatus for making filter tip cigarettes in which cigarettes are received from a cigarette making machine which axially discharges cut lengths of cigarette rod, a rotating assembly drum, means adjacent said assembly drum for axially spacing said cut lengths of cigarette rod as they travel axially, means adjacent said assembly drum for laterally displacing pairs of said axially spaced lengths of cigarette rod and depositing them on said assembly drum, means positioned adjacent said assembly drum for separating said spaced lengths of rod from each other while supported on said drum, a filter plug feed adjacent said assembly drum for delivering a double length filter plug to said assembly drum in the space between said spaced lengths of cigarette rod, guides adjacent said assembly drum for moving said spaced lengths of rod into axial abutment with the ends of said double length filter plug, means adjacent said assembly drum for rotating said abutting lengths of rod and filter plug, a tip applier adjacent said assembly drum for joining the ends of said rod to said double length filter plug by means of tip material, and means for severing said double plug through the center to form two filter tip cigarettes.

24. Apparatus for making filter tip cigarettes comprising an assembly drum having a plurality of pockets, means adjacent said assembly drum for receiving cigarettes being discharged by a cigarette making machine discharging cut lengths of cigarette rod axially, members adjacent said assembly drum for deflecting pairs of said axially discharged cigarettes laterally and to deposit them into the pockets of the assembly drum, means adjacent said assembly drum for axially separating the individual cut lengths of cigarette rod supported in said pockets, a plug feed adjacent said assembly drum for positioning a double length filter plug in the space between said axially spaced cut lengths of cigarette rod, means adjacent said assembly drum for bringing the ends of said cut lengths of cigarette rod into abutment with the ends of said double length filter plug, means adjacent said assembly for rotating the cut lengths of cigarette rod and filter plug, means adjacent said assembly drum for applying a uniting band about said double length filter plug and a portion of the end of said cut lengths of cigarette rod abutting said double length filter plug to join them together, and means for severing said double length filter plug across its center to form two filter tip cigarettes.

25. Apparatus for making hollow mouthpiece cigarettes which comprises a source of supply of cut lengths of cigarette rod, a drum having pockets for receiving said cut lengths of cigarette rod, means adjacent said drum for spacing said cut lengths of cigarette rod axially, means adjacent said drum for deflecting pairs of spaced cut lengths of cigarette rod laterally and depositing them into the pockets of said drum, means adjacent said drum for axially spacing the individual cut lengths of each pair from each other in said pockets, a source of supply of double length mouthpiece material adjacent said drum to deposit said mouthpiece material into the space located between each pair of spaced cut lengths of cigarette rod, means adjacent said drum for bringing the ends of said spaced cut lengths of cigarette rod into axial abutment with the ends of the double length hollow mouthpiece material, means adjacent said drum for rotating the cut length of cigarette rod and the mouthpiece material, a tip applier adjacent said drum for wrapping a tip about the hollow mouthpiece material and the abutting end of said cut lengths of cigarette rod to join said cut lengths of cigarette rod to said double length hollow mouthpiece, and a cutter for severing said double length mouthpiece across its center to form two hollow mouthpiece cigarettes.

References Cited in the file of this patent

UNITED STATES PATENTS

| | | |
|---|---|---|
| 1,752,340 | Hohn | Apr. 1, 1930 |
| 1,822,316 | Ruau | Sept. 8, 1931 |
| 1,988,518 | Rundell | Jan. 22, 1935 |
| 1,999,911 | May | Apr. 30, 1935 |
| 2,002,886 | Edwards | May 28, 1935 |
| 2,124,397 | Gwinn et al. | July 19, 1938 |
| 2,145,528 | Ruau | Jan. 31, 1939 |
| 2,152,416 | Molins | Mar. 28, 1939 |
| 2,162,424 | Edwards | June 13, 1939 |
| 2,165,144 | Lubbock | July 4, 1939 |
| 2,188,998 | Edwards | Feb. 6, 1940 |
| 2,236,150 | Maltby | Mar. 25, 1941 |
| 2,509,725 | Dalton | May 30, 1950 |
| 2,539,372 | Metzler | Jan. 23, 1951 |
| 2,649,761 | Edwards | Aug. 25, 1953 |
| 2,707,960 | Janecke | May 10, 1955 |
| 2,740,409 | Korber | Apr. 3, 1956 |
| 2,902,040 | Korber et al. | Sept. 1, 1959 |

FOREIGN PATENTS

| | | |
|---|---|---|
| 504,073 | Belgium | July 14, 1951 |